3,041,336
3-OXO-1.2.6-THIADIAZINE-1.1-DIOXIDES
Helmut Teufel, Biberach an der Riss, Germany, assignor to Geigy Chemical Corporation, Ardsley, N.Y., a corporation of Delaware
No Drawing. Filed Sept. 23, 1959, Ser. No. 841,705
Claims priority, application Switzerland Oct. 1, 1958
8 Claims. (Cl. 260—243)

The present invention concerns 3-oxo-1.2.6-thiadiazine-1.1-dioxides and their salts which are pharmacologically valuable substances as well as intermediate products for the production of such substances and which correspond to the general furmulae

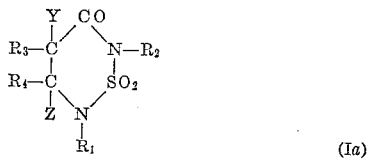

(Ia)

or

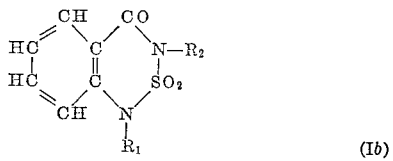

(Ib)

wherein $R_1$ represents a member selected from the group consisting of hydrogen, lower alkyl, allyl, cyclohexyl, cyclopentenyl, phenyl, benzyl, lower alkanoyl, benzoyl, benzene sulphonyl, lower alkoxyalkyl, lower dialkylaminoethoxyethyl, lower dialkylaminoalkyl, pyrrolidinoethyl, piperidinoethyl, morpholinoethyl, lower chloralkyl and bromalkyl radicals, $R_2$ represents a member selected from the group consisting of hydrogen, lower alkyl, phenyl, benzyl and cyclohexyl radicals, $R_3$ represents a member selected from the group consisting of hydrogen and phenyl, $R_4$ represents a member selected from the group consisting of hydrogen, the phenyl radical and a chlorine atom, Y represents a member selected from the group consisting of hydrogen and, together with Z, an additional C—C linkage, and Z represents a member selected from the group consisting of hydrogen and, together with Y, an additional C—C linkage.

These compounds are produced by cyclising, advantageously in the presence of an acid binding agent while splitting off hydrogen halide, $HX_1$, N-acyl sulphamides of the general formula

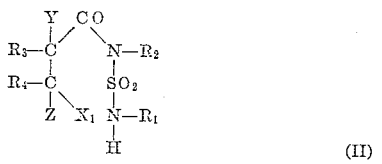

(II)

wherein $X_1$ represents chlorine, bromine or iodine, and $R_1$, $R_2$, $R_3$, $R_4$, Y and Z have the meanings given above.

The ring can be closed, for example, by heating the starting components, advantageously in the presence of acid binding agents such as alkali carbonates, alkali alcoholates or tertiary organic bases in the presence or absence of inert organic solvents such as, e.g. benzene, toluene, xylene, higher ethers or halogenated hydrocarbons.

N-acyl sulphamides as starting materials of the general formula II can be produced by known methods, for example by acylating substituted sulphamides of the general formula $$R_1-NH-SO_2-NH-R_2 \quad (III)$$

wherein $R_1$ and $R_2$ are advantageously the same or very different radicals according to the above definitions with β-halogen carboxylic acids or reactive functional derivatives thereof, for example the halides or anhydrides, the acylation being performed advantageously in the presence of acid binding agents and/or a dehydrating agent, if desired, in suitable inert solvents.

Mono- and di-substituted sulphamides of the general Formula III can be produced in their turn for example by reacting N-substituted N-acyl sulphamic acid chlorides such as, e.g. the N-formyl-N-phenyl sulphamic acid chloride obtained according to Meybeck, Ann. chim. (10) 17, 129 (1932), from the sodium compound of formanilide and sulphuryl chloride, with ammonia or with primary amines of the formula $R_1-NH_2$ and splitting off the N-acyl group by excess amine or by alkalies.

Examples of further methods for the production of sulphamides are:

The reaction of diacylimide sulphochlorides with primary amines followed by splitting off the acyl radicals, see M. Battegay, L. Denivelle, Bull. soc. chim. France (4) 53, 1242 (1933); the reaction of sulphuryl chloride with primary amines, e.g. aniline, to form symmetrical disubstituted products such as, e.g. sulphanilide, see A. Wohl, F. Koch, Ber. 43, 3295 (1910);

The reaction of suitable sulphuric acid esters or chlorosulphonic acid esters such as, e.g. diphenyl sulphate or phenyl chlorosulphonate, with primary aliphatic or araliphatic amines to form symmetrical disubstituted sulphamides, see, e.g. Denivelle, Bull. soc. chim. France (5) 3, 2143 (1936);

The reaction of sulphamide as well as of N-monosubstituted sulphamides to corresponding higher substituted sulphamides according to A. M. Paquin, Angew. Chemie, A 60, 316 (1948).

As starting materials of the general Formula II suitable N-acyl derivatives of N-monosubstituted sulphamides ($R_2$=hydrogen) can also be produced for example starting from N-carbonyl sulphamic acid chloride and suitable β-halogen carboxylic acids, see R. Graf, Farbwerke Hoechst, German patent application F 12 877/12q (30.6. 1952). By adding acids to the —N=C— linkage first mixed anhydrides are formed which can be decarboxylated to N-acyl sulphamic acid chlorides which can then be further reacted with primary amines.

The following acyl sulphamides are given as examples of starting materials of the general Formula II:

3-bromopropionyl sulphamide, N-(3-bromobutyryl)-N'-n-propyl sulphamide, N-(3-bromobutyryl)-N'-isoamyl sulphamide, N-(3-bromobutyryl)-N'-benzyl sulphamide, N-(3-bromobutyryl)-N'-phenyl sulphamide, N-(3-chloropropionyl)-sulphanilide, N-(3-bromopropionyl)-N.N'-dicyclohexyl sulphamide, N-(3-bromopropionyl)-N.N'-dibutyl sulphamide, N-(3-bromo-3-phenylpropionyl)-sulphanilide, N-(2-bromobenzoyl-N'-sulphanilide and N-(2-bromo-4-nitrobenzoyl)-sulphanilide.

It has also been found that compounds of the general formula Ia can be produced by cyclising, while splitting off $HX_2$, β-sulphamido carboxylic acids of the general formula

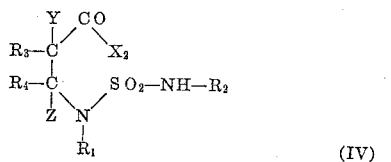

(IV)

wherein $X_2$ is a residue which is easily split off such as, e.g. a hydroxy, alkoxy or aryloxy group or a halogen atom and the other symbols have the definitions given above. The reaction conditions for the ring closure depend on the type of substituent $X_2$; in the most advantageous case it occurs already at room temperature or at a slightly raised temperature.

The starting compounds of the general formula IV can be produced by known methods. For example, N-phenyl-N' - (o-carboxyphenyl)-sulphamide [2-(N'-phenylsulphamido)-benzoic acid] is obtained from N-formyl-N-phenyl sulphamic acid chloride and anthranilic acid according to M. Battegay, French Patent No. 735,765. Numerous other β-sulphamidocarboxylic acids can be produced in an analogous manner from suitably substituted sulphamic acid chlorides, in particular from substituted N-formyl sulphamic acid chlorides and β-aminocarboxylic acids. Such β-sulphamidocarboxylic acids of the general Formula IV wherein $X_2$ is a hydroxyl group, can be cyclised, under the influence of chlorinating condensing agents or of condensing agents which split off water, e.g. by warming in the presence of phosphorus oxychloride, to form compounds of the general Formula Ia. Excess phosphorus oxychloride or a chlorinated hydrocarbon can be used for example as solvent.

β-Sulphamidocarboxylic acid esters, as starting materials of the general Formula IV wherein $X_2$ is an alkoxy or an aryloxy group, are produced by reacting suitable β-aminocarboxylic acid esters with sulphamic acid chloride which is obtained by decomposing N-carbonyl sulphamic acid chloride with water according to R. Graf, German Patent No. 937,646. They are also obtained by reacting suitable β-aminocarboxylic acid esters with N-substituted sulphamic acid chloride, N-acyl sulphamic acid chlorides or N-substituted N-acyl sulphamic acid chlorides, advantageously in the presence of acid binding agents such as tertiary organic bases or of excess β-aminocarboxylic acid ester, and then, if necessary, splitting off the acyl radical. Such esters of the general Formula IV are thus advantageous starting materials, particularly because, in so far as $R_2$ is hydrogen, immediately they are formed they are converted into end products of the general Formula Ia in the same step, e.g. on gentle warming of the reaction mixture. If necessary, ring closure can be accelerated, for example, by the addition of organic bases or salts thereof. When $R_2$ is a hydrogen atom, ring closure in particular occurs generally at temperatures between 15 and 50° when $R_3$ and $R_4$ are also hydrogen or, however, low molecular alkyl radicals, or when Y and Z and the carbon atoms pertaining thereto form a possibly substituted benzene nucleus. On the other hand, when $R_2$ is a phenyl or benzyl radical, then ring closure is performed under more energetic conditions, for example at temperatures between 50 and 120°.

Examples of β-aminocarboxylic acids which either in the free form or as esters of low molecular alkanols, in particular as methyl or ethyl esters, can be reacted with sulphamic acid derivatives to form starting materials of the general Formula IV are: β-alanine, 3-aminobutyric acid, 2-methyl-3-aminobutyric acid, 3-aminocaproic acid, 2 - cyclohexyl - 3 - aminopropionic acid; 2-cyclohexyl-2-methyl-3-aminopropionic acid, 2-ethyl-2-phenyl-3-aminopropionic acid; 2-ethyl-2-phenyl-3-aminopropionic acid, 2.2-dibenzyl-3-aminopropionic acid, 2.3-diphenyl-3-ethylaminoproprionic acid, 2-m-nitrophenyl-3-p-tolyl-3-isopropylaminopropionic acid, 3-(2'-bromethylamino)-n-butyric acid, 3-(2'-diethylaminoethylamino)-propionic acid, 3 - phenyl - 3 -(3'-dimethylaminopropylamino)-propionic acid; anthranilic acid, N-methyl-anthranilic acid, N-(2'-diethylamino-ethyl)-anthranilic acid, 3-nitro-anthranilic acid, 5-nitro-anthranilic acid, 5-sulphonamido-anthranilic acid, 3-chloranthranilic acid, 4-chloranthranilic acid, 5-chloranthranilic acid, 3.5-dichloranthranilic acid, 4.6-dichloranthranilic acid, 5-bromanthranilic acid, 4-nitroanthranilic acid, 3-chloro-5-nitro-anthranilic acid, 3.5-dinitro-anthranilic acid, 5-methoxy-anthranilic acid.

The above and other β-aminocarboxylic acids and esters thereof can be reacted, for example, with sulphamic acid chloride, N-methyl-N-formyl sulphamic acid chloride, N-ethyl-N-formyl sulphamic acid chloride, N-butyl-N-formyl sulphamic acid chloride, N-cyclohexyl-N-formyl sulphamic acid chloride, N-phenyl-N-formyl sulphamic acid chloride, N-phenyl-N-acetyl sulphamic acid chloride, N-(p-chlorophenyl)-N-formyl sulphamic acid chloride or N-benzyl-N-formyl sulphamic acid chloride. These sulphamic acid chlorides may be used without further purification in the form of solutions obtained in the course of their preparation.

Examples of β-sulphamidocarboxylic acids are: 3-sulphamidopropionic acid; 3-(N'-methylsulphamido)-propionic acid; 3-sulphamido-2-ethyl-2-phenylpropionic acid; 3-(N'-phenyl-N-cyclohexyl-sulphamido)-butyric acid; 3-(N-ethyl-sulphamido)-2.3-diphenylbutyric acid; 3-(N-diethylaminoethyl-sulphamido)-propionic acid; 2-(p-sulphamoyl-phenyl) - 3 - (N-methyl-sulphamido)-3-phenylpropionic acid; 2-sulphamido-benzoic acid; 2-(N'-butyl-sulphamido)-benzoic acid; 3-chloro-5-nitro-2-sulphamido-benzoic acid.

If desired, compounds of the general Formulae Ia and Ib, wherein at least one of $R_1$ and $R_2$ is hydrogen, can be converted into the corresponding substituted compounds by subsequent introduction of substituents. This is done, advantageously in the presence of acid binding agents or after conversion of such compounds into salts, by reacting them with reactive compounds of the general formulae

or

wherein $X_3$ is an inorganic acid radical and $R_1$ and $R_2$ have the meanings given under general Formulae Ia and Ib. There is only a formal difference between compounds of general Formulae V and VI. Apart from the usual alkylating and aralkylating agents such as, e.g. methyl iodide, dimethyl sulphate, ethyl bromide, diethyl sulphate, n-butyl bromide, allyl bromide, benzyl bromide and p-chlorobenzyl chloride, also the most variously substituted alkyl halides and halides of carbonic acid, carboxylic acids, sulphonic acids, sulphenic acids and carbamide acid; esters, amides and nitriles of halogen carboxylic acids and other types of compounds are used as such compounds as can be seen from the following examples: 2-chlorethyl bromide-(1), 2-bromethanol-(1), 2-bromethylamine-(1), N-methyl-2-bromethylamine-(1), N-(2-chlorethyl)-piperidine; 2-dimethylaminoethyl chloride-(1); 3-(4'-morpholino)-propylchloride-(1); N-formyl-sulphanilic acid chloride; chlorocarbonic acid ethyl ester; chloracetonitrile; 2-chloracetamide; chloracetic acid ethyl ester, 2-chloracetyl piperidide, 2 - chloracetyl - (dimethylaminoethyl) - amide; benzene sulphonic acid chloride; trichloromethyl sulphenic acid chloride; ω-bromacetophenone; monochloracetone; 2-bromethylmethyl sulphone; 1-methyl-thioethyl bromide-(2); p-sulphamoyl benzyl chloride; 1-methoxy-2-chloropropane.

The reactions can be performed in inert organic solvents such as hydrocarbons, halogen hydrocarbons or low molecular alkanones, in which case when using free starting materials of the Formulae Ia and Ib, for example, alkali carbonates or bicarbonates or tertiary organic bases are useful as acid binding agents. As salts of the starting materials of Formulae Ia and Ib, for example, their alkali metal salts or salts with comparable monovalent cations such as, e.g. (MgHal)+, also earth alkali salts or salts of organic bases are used. As already mentioned above, in the starting materials of the general Formulae Ia and Ib, either $R_1$ or $R_2$ or both of $R_1$ and $R_2$ can be hydrogen.

In addition, compounds are obtained of the limited

Formula Ia' which are embraced by the general Formula Ia

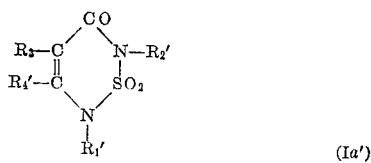

wherein $R_1'$ and $R_2'$ have the meanings given for $R_1$ and $R_2$ in general Formula Ia with the exception of hydrogen atoms and of radicals substituted by hydroxy or amino groups, $R_3$ has the meaning given in general Formula Ia, and $R_4'$ represents a halogen atom, in particular chlorine or bromine, and thus the symbols Y and Z not appearing in this Formula Ia' represent an additional C—C linkage, by treating substituted 3.5-dioxo-tetrahydro-1.2.6-thiadiazine-1.1-dioxides of the general formula

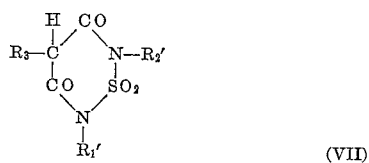

wherein $R_1'$, $R_2'$, $R_3$ have the meanings given above, or treating the tautomeric enol form thereof with a halogenating agent, in particular with an inorganic acid halide such as, e.g. phosphorus pentachloride or bromide, phosphorus oxychloride or bromide or with phosphorus tribromide. The reaction can be performed, for example at temperatures between 60 and 150°, advantageously between 90–120°, and with the use of suitable acid binding agents such as, e.g. tertiary organic bases, or it can be performed in the presence of acid catalysts such as, e.g. hydrogen halide, which is added as such or can be liberated by the addition of water in slight amounts of 0.001–0.15 equivalent of the halogenating agent used.

The compounds of the general Formula Ia' do not only possess valuable pharmacological properties themselves but, because of their halogen atom which can be exchanged in different ways, they are also valuable intermediate products. Among other things, by treatment with reducing agents such as, e.g. hydrogen iodide, nascent or catalytically activated hydrogen, they can be converted into compounds of the general Formula Ia in which $R_4$ is hydrogen. Also, by suitable choice of reducing agent and the reaction conditions, the reaction can be limited to the exchange of the halogen atom or, if desired, the double linkage can also be reduced so that saturated reduction products are formed in which the symbols Y and Z are two hydrogen atoms.

The starting materials of the general Formula VII can be easily obtained, for example, by reacting correspondingly substituted malonic acid dihalides with substituted sulphamides.

This and other processes for the production of these starting materials are described, for example, in the Belgian Patent No. 566,418. The following are given as examples of starting materials for this process: 2.6-diphenyl - 3.5 - dioxotetrahydro - 1.2.6 - thiadiazine - 1.1-dioxide and derivatives thereof substituted in the 4-position by the methyl, isopropyl, n-butyl, cyclohexyl, phenyl or benzyl radical, as well as 2.6-di-n-butyl-3.5-dioxotetrahydro - 1.2.6 - thiadiazine - 1.1 - dioxide, 2.6-dicyclohexyl - 3.5 - dioxotetrahydro - 1.2.6 - thiadiazine - 1.1-dioxide and 2.6-dibenzyl-4-ethyl - 3.5 - dioxotetrahydro-1.2.6-thiadiazine-1.1-dioxide.

If desired, compounds of the general Formulae Ia and Ib in which at least one of the symbols $R_1$ and $R_2$ is hydrogen, can be converted into their salts with inorganic or organic bases. The salts produced according to the invention can also be double salts, e.g. with polyalcohols such as glycerin, such as are formed on performing the salt formation with the inorganic or organic base in the presence of the polyalcohol desired as salt component.

By conversion into salts, for example, into alkali metal salts, the pharmacologically active compounds of the general Formulae Ia and Ib can be brought into an easily water soluble form and thus applied parenterally. These salts can also be used together with other pharmaceuticals; in addition, some of them are excellently suitable as solubility promoters for other therapeutical substances which are difficultly soluble in water in their pure form.

Thiadiazine compounds according to the present invention can be used as antiphlogistics, antipyretics and analgetics. Of particular value are compounds of Formula Ib, in which $R_1$ represents hydrogen, lower alkyl, allyl, cyclohexyl, phenyl, benzyl, lower alkanoyl, benzoyl, lower dialkylaminoethoxyethyl, lower dialkylaminoalkyl, pyrrolidinoethyl, piperidinoethyl and morpholinoethyl radicals, and $R_2$ represents hydrogen, lower alkyl, phenyl, benzyl and cyclohexyl radicals.

For example, the compounds 1-benzyl-3-phenyl-4(3H)-oxo - 5.6 - benzo - 2.1.3 - thiadiazine-2.2-dioxide, 5-chloro-2.6 - diphenyl - 4 - n - propyl-3(2H)-oxo-1.2.6-thiadiazine - 1.1 - dioxide or 3-butyl-1-(2'-diethylaminoethyl) - 4(3H) - oxo - 5.6 - benzo-2.1.3-thiadiazine-2.2-dioxide can be used enterally or parenterally as antiphlogistic (anti-inflammatory) agents; the last named compound can also be used as an antipyretic and analgetic agent.

The following examples illustrate the performance of the processes according to the invention but by no means represent the sole means of doing so. Parts are given as parts by weight and their relationship to parts by volume is as that of grammes to cubic centimetres. The temperatures are in degrees centigrade.

EXAMPLE 1

The solutions of 4.6 parts of sodium in 150 parts by volume of anhydrous ethanol and of 24.8 parts of sulphanilide in 300 parts by volume of anhydrous ethanol are combined and heated in a sloping condenser. The ethanol which is distilled off is replaced by anhydrous xylene until pure xylene is distilled off. At the boiling temperature of the xylene, a solution of 20.1 parts of o-bromobenzoic acid in 800 parts by volume of xylene is added dropwise to the suspension obtained. After distilling off a further amount of xylene, the mixture is refluxed for 14 hours. Acid portions are removed from the reaction mixture by shaking out with sodium bicarbonate solution; after drying, the organic phase is concentrated in the vacuum. On recrystallising the residue obtained from methanol and from ethanol, pure 1.3 - diphenyl - 4(3H) - oxo - 2.1.3 - benzothiadiazine-2.2-dioxide is obtained. M.P. 163–164°.

EXAMPLE 2

In a three-necked flask fitted with a stirrer, 5 parts of N - phenyl-N'-(o - carboxyphenyl) - sulphamide (M.P. 151–153°) are suspended in 50 parts by volume of phosphorus oxychloride. The mixture is slowly heated and stirred for 3 hours at 70° and then for another 3 hours at 80–90° (bath temperature). The reaction mixture is left to stand overnight, it is then diluted with double the amount of chloroform and petroleum ether is carefully added. The crude 3 - phenyl - 4(3H) - oxo - 2.1.3-benzothiadiazine-2.2-dioxide crystallises out in the cold. It is obtained in a pure form by repeated recraystallisation from ethylene chloride or from diluted methanol. M.P. 201–203°.

EXAMPLE 3

14.2 parts of N-carbonyl sulphamic acid chloride in 75 parts of anhydrous toluene are reacted under exterior cooling by the dropwise addition of 1.8 parts of water in 10 parts by volume of acetone. The mixture is stirred for 30 minutes at room temperature and for another 30 minutes at 40° and then 38.6 parts of β-anilino-propionic acid ethyl ester in 50 parts by volume of anhydrous toluene are added dropwise within one hour at a temperature between 0 and +10°. The cooling is then removed, the reaction mixture is stirred first for 3½ hours at room temperature, then for 3 hours at 50–60° and, after standing overnight, for another 2 hours at 60–70°. After cooling, it is extracted with caustic soda lye; on acidifying the alkali solutions, 6-phenyl-3-oxo-tetrahydro-1.2.6-thiadiazine-1.1-dioxide is obtained which, after recrystallisation from ethanol/water and from ethylene chloride, melts at 122–124°.

The following compounds according to the general Formula Ia can be obtained in an analogous manner from substituted β-amino-carboxylic acid esters:

Table 1

| $R_1$ | $R_2$ | $R_3$ | $R_4$ | Y | Z | M.P., °C. |
|---|---|---|---|---|---|---|
| Isopropyl | H | H | H | H | H | 140–142 |
| n-Butyl | H | H | H | H | H | 110–112 |
| Cyclohexyl | H | H | H | H | H | 142–144 |
| Phenyl | H | H | H | H | H | 122–124 |
| Benzyl | H | H | H | H | H | 190–192 |
| Do | H | H | Methyl | H | H | 138–140 |
| Cyclohexyl | H | H | do | H | H | 164–166 |
| Phenyl | H | H | do | H | H | 159–161 |
| Methyl | H | Phenyl | Phenyl | H | H | 230–232 |
| 2′-diethyl-amino-ethyl | H | H | H | H | H | 195–196 |
| H | H | Ethyl | H | $C_6H_5$ | H | |
| Methyl | H | Benzyl | Methyl | $C_2H_5$ | H | |

EXAMPLE 4

2.3 parts of sodium are melted in 150 parts by volume of anhydrous xylene and, on cooling, the sodium is finely suspended by energetic stirring. The solution is warmed and at 160° (bath temperature), a solution of 10.1 parts of N-butyl formamide in 30 parts by volume of anhydrous xylene is added dropwise. After refluxing for another 1½ hours, a clear solution is formed. This is allowed to cool, cooled to −10° and 13.5 parts of sulphuryl chloride diluted with 70 parts by volume of xylene are added dropwise within 2 hours while stirring. The mixture is stirred in a cold bath for another hour, left to stand overnight and then kept for 2 hours at 30–40°. The excess sulphuryl chloride is distilled off in a water jet vacuum at a bath temperature of up to 50° and, at about 30°, 30.2 parts of anthranilic acid methyl ester in 50 parts by volume of anhydrous toluene are added dropwise within 30 minutes. Finally, the reaction mixture is heated for 5 hours at 40–55° and, after cooling, is extracted with caustic soda lye. After washing with ether, the alkaline/aqueous solution is acidified whereupon the 3-butyl-4(3H)-oxo-2.1.3-benzothiadiazine-2.2-dioxide precipitates. It is recrystallised from methanol and from cyclohexane and melts at 124–125°.

EXAMPLE 5

The solution of 7.6 parts of anthranilic acid methyl ester in 60 parts by volume of anhydrous ether is added dropwise under exterior cooling with ice to a suspension of 6.5 parts of N-formyl-N-phenyl-sulphamic acid chloride in 90 parts by volume of anhydrous ether. As no noticeable exothermic reaction takes place, after a short time the ice bath is removed and the ester solution is added over a period of 1½ hours, finally at room temperature. The suspension formed is refluxed for 5 hours, then cooled with ice water and 50 parts by volume of 2 N-caustic soda lye are slowly added. After thoroughly stirring, the ether solution is separated and extracted three times with diluted caustic soda lye. The combined alkaline extracts are washed with ether and then acidified with concentrated hydrochloric acid under ice water cooling. A product which melts at 186–190° (on decomposition) is obtained. It crystallises from ethylene chloride into white needles which melt at 203–205°. The substance is identical with the 3-phenyl-4(3H)-oxo-2.1.3-benzothiadiazine-2.2-dioxide obtained from free anthranilic acid (Example 2).

The following compounds of Formula VIII

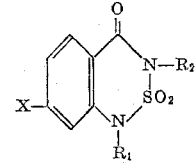

(VIII)

can be produced in an analogous manner with, e.g. N-phenyl-N-formyl sulphamic acid chloride or with a solution of sulphamic acid chloride obtained according to Example 3:

Table 2

| $R_1$ | $R_2$ | X | M.P., °C. |
|---|---|---|---|
| H | H | H | 226–228 [1] |
| H | H | $NO_2$ | 225–228 |
| Methyl | H | H | 204–205 |
| H | Methyl | H | 199–201 |
| H | Ethyl | H | 177–179 |
| H | n-Butyl | H | 124–125 |
| H | Cyclohexyl | H | 158–159 |
| H | Benzyl | H | 191–193 |
| H | o-Chloro-phenyl | H | 212–214 |
| H | H | Cl | 222–224 |

[1] Decomposition.

EXAMPLE 6

27.4 parts of 3-phenyl-4(3H)-oxo-2.1.3-benzothiadiazine-2.2-dioxide are suspended in 900 parts of anhydrous ethanol and dissolved as sodium salt by the addition of the equimolecular amount of sodium ethylate solution (from 2.3 parts of sodium). 17 parts of benzyl bromide diluted with anhydrous ethanol are added dropwise at room temperature and the whole is heated for 6 hours at 90–100° (bath temperature). The mixture is left standing overnight and then crystallised by cooling. 1-benzyl-3-phenyl-4(3H)-oxo-2.1.3-benzothiadiazine-2.2-dioxide is obtained as a crystalline, colourless substance which melts at 133–135°. It is obtained in a pure form by recrystallisation from ethanol or di-isopropyl ether (M.P. 134–135°). On concentrating the reaction solution, a further part of the compound is obtained. Slight amounts of unchanged starting material are removed by treatment with caustic soda lye.

EXAMPLE 7

21 parts of the sodium salt of 3-phenyl-4(3H)-oxo-2.1.3-benzothiadiazine-2.2-dioxide are dissolved in 150 parts by volume of acetone and the solution is reacted with 8.7 parts of chloracetic acid ethyl ester by first stirring for 4 hours at room temperature and then refluxing for 2½ hours. After allowing the reaction mixture to stand, the crystals which precipitated are filtered off under suction, ground in water and then dried; a further amount of the reaction product is isolated by concentrating the acetone solution. Pure 1-(carbethoxymethyl)-3-phenyl-4(3H)-oxo-2.1.3-benzothiadiazine-2.2-dioxide (M.P. 174–175°) is obtained by recrystallisation from ethanol.

EXAMPLE 8

5.5 parts of 3-phenyl-4(3H)-oxo-2.1.3-benzothiadiazine-2.2-dioxide in 100 parts by volume of anhydrous acetone are heated to 50° with 2.8 parts of potassium carbonate, and 5.2 parts of 2-diethylaminoethyl bromide-(1)-hydrobromide are added in small portions over a period of 1½ hours while stirring. The mixture is then refluxed for 26 hours while stirring and, after cooling, undissolved particles are filtered off under suction. The filtrate is evaporated to dryness and the residue is recrystallised from cyclohexane. The pure 1-(2′-diethylaminoethyl)-3- phenyl - 4(3H) - oxo - 2.1.3-benzothiadiazine-2.2-dioxide melts at 85–87°.

By subsequent substitution of 3-substituted 4(3H)-oxo-2.1.3-benzothiadiazine-2.2-dioxides in the 1-position according to Examples 6, 7 or 8, the following compounds of Formula IX can be obtained, for example:

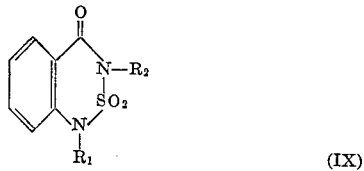

(IX)

Table 3

| $R_1$ | $R_2$ | M.P., °C. |
|---|---|---|
| 2-(dimethylamino)-ethyl | Methyl | [1] 74– 75 |
|  |  | [2] 195–196 |
| 2-(1'-pyrrolidino)-ethyl | do | [1] 87– 88 |
|  |  | [2] 241 |
| 2-(4'-morpholino)-ethyl | do | [1] 85– 86 |
|  |  | [2] 241–242 |
| 2-(dimethylamino)-ethyl | n-Butyl | [1] 52– 54 |
| 2-(diethylamino)-ethyl | do | [2] 146–148 |
| 2-(dicyclohexylamino)-ethyl | do | [1] 94– 95 |
| 3-(diethylamino)-propyl | do | [2] 96– 98 |
| H₂N—SO₂—⟨ ⟩—NH—CO—CH₂— | do | 220–222 |
| Methyl | Phenyl | 189–190 |
| n-Butyl | do | 105–106 |
| Allyl | do | 115–117 |
| Δ²-cyclopentenyl | do | 138–140 |
| 2-hydroxy-ethyl | do | 187–189 |
| 2-bromethyl | do | 187–188 |
| 3-chloropropyl | do | 115–117 |
| 3-bromopropyl | do |  |
| 2-chlorethyl | do |  |
| 2.3-epoxypropyl | do | 153–155 |
| 2-(diethylamino)-ethyl | do | 85– 87 |
| 2-(di-isopropylamino)-ethyl | do | 79– 81 |
| 2-(dimethylamino)-propyl | do | [2] 65– 68 |
| 2-(1'-piperidino)-ethyl | do | 106 |
| 2-(4'-morpholino)-ethyl | do | 133–134 |
| (piperidino-carbonyl)-methyl | do | 163–165 |
| Benzoyl | do | 147–148 |
| β-Chloropropionyl | do | 144–146 |
| Ethoxycarbonyl | do | 170–172 |
| (Ethoxycarbonyl)-methyl | do | 174–175 |
| (Benzoyl)-methyl | do | 143–144 |
| Nitrilo-methyl | do | 215 |
| Dimethylamino-sulphonyl | do | 150–152 |
| p-(Formylamino)-benzene-sulphonyl | do | 201–202 |
| p-(Acetylamino)-benzene sulphonyl | do | [3] 193–195 |
| Trichloromethyl-thio | do | 118–120 |
| H₂N—SO₂—⟨ ⟩—NH—CO—CH₂— | do | 254–256 |
| Δ²-cyclopentenyl | Benzyl | 84– 86 |

[1] Base.  [2] Hydrochloride.  [3] Decomposition.

Furthermore, 1.3-dibenzyl-4(3H)-oxo-2.1.3-benzothiadiazine-2.2-dixoide (M.P. 127–128°) may be prepared from the sodium salt of 4(3H)-oxo-2.1.3-benzothiadiazine-2.2-dioxide with, e.g. benzyl bromide.

The following compounds can be produced analogous to the processes described in Examples 7 and 8:

1-methoxy-ethyl-3-phenyl-4(3H)-oxo-2.1.3-benzothiadiazine-2.2-dioxide, M.P. 100–101°,
1-ethoxy-ethyl-3-phenyl-4(3H)-oxo-2.1.3-benzothiadiazine-2.2-dioxide, M.P. 104–105°,
1-isopropoxy-ethyl-3-phenyl-4(3H)-oxo-2.1.3-benzothiadiazine-2.2-dioxide, M.P. 116–117°,
1-n-butoxy-ethyl-3-phenyl-4(3H)-oxo-2.1.3-benzothiadiazine-2.2-dioxide, M.P. 59–60°,
1-diethylamino-ethoxy-ethyl-3-phenyl-4(3H)-oxo-2.1.3-benzothiadiazine-2,2,-dioxide, M.P. 164–166° (hydochloride).

EXAMPLE 9

10 parts by volume of water are added while stirring at room temperature to a mixture of 31.6 parts of 2.6-diphenyl-3.5-dioxo-tetrahydro-1.2.6 - thiadiazine-1.1-dioxide and 250 parts by volume of phosphorous oxychloride. After the energetic development of hydrogen chloride has ceased, the reaction mixture is refluxed while stirring for another 8 hours in an oil bath at about 130°. The solvent is distilled off in the vacuum and the semi-solid residue is decomposed with ice and ice water. The undissolved part is filtered off under suction, triturated with 30 parts by volume of 5 N-caustic soda lye to remove starting material, again filtered off under suction and washed neutral. The 5-chloro-2.6-diphenyl-3(2H)-oxo-1.2.6-thiadiazine-1.1-dioxide is dried and purified by recrystallisation from benzene, M.P. 169–170.5°.

The following compounds are obtained according to this example: 4-n-propyl-5-chloro-2.6-diphenyl-3(2H)-oxo-1.2.6-thiadiazine-1.1-dioxide (M.P. 114–116°), 4-n-amyl - 5 - chloro - 2.6 - diphenyl - 3(2H) - oxo - 1.2.6-thiadiazine-1.1-dioxide (M.P. 105–106°) and 4-phenyl-5-chloro - 2.6 - diphenyl - 3(2H) - oxo - 1.2.6 - thiadiazine-1.1-dioxide (M.P. 211–212°).

EXAMPLE 10

6.7 parts of 5-chloro-2.6-diphenyl-3(2H)-oxo-1.2.6-thiadiazine-1.1-dioxide are dissolved by warming in 60 parts by volume of benzene, a solution of 12 parts of ammonium chloride in 100 parts by volume of water is added and, at a bath temperature of 90°, zinc dust is added in small portions while stirring strongly. During the reaction, saturated ammonium chloride solution is added in two portions to the mixture (total amount 25 parts of ammonium chloride, 12 parts of zinc dust). After 15 hours, the zinc slurry is filtered off hot under suction, the zinc residue is again boiled down with benzene and, to remove the salts, the combined benzene solutions are washed first with 2 N-hydrochloric acid and then with water, dried with sodium sulphate and concentrated in the vacuum to dryness. Pure 2.6-diphenyl-3(2H)-oxo-1.2.6-thiadiazine-1.1-dioxide is obtained by recrystallisation from ethyl acetate and from carbon tetrachloride (M.P. 189–190°).

EXAMPLE 11

First, 2 parts of palladium-calcium carbonate catalyst (2%) are hydrogenated in 200 parts by volume of isopropanol. The isopropanol is decanted off, 2 parts of 5 - chloro - 2.6 - diphenyl - 3(2H) - oxo - 1.2.6 - thiadiazine-1.1-dioxide are dissolved therein, 0.5 part of magnesium oxide freshly produced by calcining magnesium carbonate are added and then 5 parts by volume of water are added. The mixture and the previously hydrogenated catalyst are then shaken in a hydrogenous atmosphere at room temperature under normal pressure. After about 50 minutes, 1 mol of hydrogen has been taken up; according to melting point and spectrum, a sample consists predominantly of the unsaturated compound described in Example 11. The further hydrogenation proceeds very slowly; it is complete after about 10–12 hours.

The suspension is warmed, the catalyst is filtered off and the filtrate is concentrated. The pure 2.6-diphenyl-3-oxo-tetrahydro-1.2.6-thiadiazine-1.1-dioxide is obtained from the crude product by recrystallisation from ethanol and from chloroform/petroleum ether. It melts at 133–133.5°.

What I claim is:
1. A thiadiazine of the formula

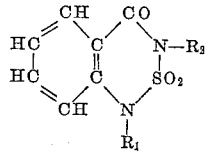

wherein $R_1$ represents a member selected from the group consisting of hydrogen, lower alkyl, allyl, cyclohexyl, phenyl, benzyl, lower alkanoyl, benzoyl, lower dialkyl-aminoethoxyethyl, lower dialkylaminoalkyl, pyrrolidino-ethyl, piperidinoethyl and morpholinoethyl, and $R_2$ represents a member selected from the group consisting of hydrogen, lower alkyl, phenyl, benzyl and cyclohexyl.

2. 1-benzyl - 3 - phenyl - 4(3H) - oxo - 5.6 - benzo-2.1.3 - thiadiazine - 2.2 - dioxide.

3. 5 - chloro - 2.6 - diphenyl - 4 - n - propyl - 3(2H)- oxo - 1.2.6 - thiadiazine - 1.1 - dioxide.

4. 3 - n - butyl - 1 - (2' - diethylamino - ethyl) - 4(3H)- oxo - 5.6 - benzo - 2.1.3 - thiadiazine - 2.2 - dioxide.

7.1 - diethylamino - ethyl - 3 - benzyl - 4(3H) - oxo-5.6 - benzo - 2.1.3 - thiadiazine - 2.2 - dioxide.

6. 1 - diethylamino - ethyl - 3 - methyl - 4(3H) - oxo-5.6 - benzo - 2.1.3 - thiadiazine - 2.2 - dioxide.

7. 1 - diethylamino - ethyl - 3 - benzyl-4(3H)-oxo-5.6-benzo - 2.1.3 - thiadiazine - 2.2 - dioxide.

8. 6 - phenyl - 3 - oxo - tetrahydro - 1.2.6 - thiadiazine-1.1 - dioxide.

References Cited in the file of this patent
UNITED STATES PATENTS

| | | |
|---|---|---|
| 2,624,729 | Melamed et al. | Jan. 6, 1953 |
| 2,886,566 | Novello | May 12, 1959 |

OTHER REFERENCES

Beilstein's Handbuch der Organischen Chemie, vol. 27, 1st supp., p. 585 (1937).

Beilstein's Handbuch der Organischen Chemie, vol. 27, p. 621 (1937).

Ainley et al.: J. Chem. Soc., 1949, pp. 147–152.